US012647382B2

(12) United States Patent

Nadendla et al.

(10) Patent No.: US 12,647,382 B2

(45) Date of Patent: Jun. 2, 2026

(54) MANAGING DIGITAL MESSAGE TRANSMISSION VIA A PROXY DIGITAL MAILBOX

(71) Applicant: Oracle International Corporation, Redwood Shores, CA (US)

(72) Inventors: Nagaraj Nadendla, Livermore, CA (US); Karthik Kothandaraman, Fremont, CA (US); Rajesh Choudary Gudiputi, San Ramon, CA (US); Advitya Khanna, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/299,641

(22) Filed: Apr. 12, 2023

(65) Prior Publication Data

US 2024/0129264 A1 Apr. 18, 2024

Related U.S. Application Data

(60) Provisional application No. 63/416,351, filed on Oct. 14, 2022.

(51) Int. Cl.
H04L 51/214 (2022.01)
H04L 51/42 (2022.01)

(52) U.S. Cl.
CPC ............ H04L 51/214 (2022.05); H04L 51/42 (2022.05)

(58) Field of Classification Search
CPC ....... H04L 51/214; H04L 51/42; H04L 45/72;
H04L 45/741; H04L 45/745; H04L 51/48;
H04L 61/09; H04L 61/00; H04L 61/2539;
H04L 61/4535; H04L 61/5061; H04L
61/59; H04N 21/42684; H04N 21/6402
See application file for complete search history.

(56) References Cited

U.S. PATENT DOCUMENTS

| | | | |
|---|---|---|---|
| 6,591,291 B1 | 7/2003 | Gabber et al. | |
| 8,658,264 B2 * | 2/2014 | Cao ........................... | B32B 7/05 |
| | | | 62/50.7 |
| 8,667,074 B1 * | 3/2014 | Farkas .................. | H04L 51/214 |
| | | | 709/206 |
| 10,701,051 B2 * | 6/2020 | Ohsumi ................. | H04L 63/08 |
| 11,438,295 B1 * | 9/2022 | Chopra .................. | H04L 51/08 |
| 11,677,878 B2 | 6/2023 | Lewinson et al. | |
| 2002/0010799 A1 * | 1/2002 | Kubota .................. | H04L 45/00 |
| | | | 709/245 |
| 2002/0114333 A1 * | 8/2002 | Xu ...................... | H04L 61/2589 |
| | | | 370/392 |

(Continued)

FOREIGN PATENT DOCUMENTS

EP 0899918 A2 3/1999

*Primary Examiner* — Michael Won

(74) *Attorney, Agent, or Firm* — Invoke

(57) ABSTRACT

Techniques for managing digital messages to and from a proxy message address are disclosed. A system receives a message directed to a particular destination address. The system replaces any source address included in the message with a proxy address. When the system receives a reply to the message, the reply is directed to the proxy address. The system analyzes message data to identify a target address for the reply message. The system identifies contextual data associated with the reply message. The system transmits the reply message, and the contextual data, to the target address.

29 Claims, 6 Drawing Sheets

(56) References Cited

U.S. PATENT DOCUMENTS

| | | | | |
|---|---|---|---|---|
| 2003/0031169 A1* | 2/2003 | Emerson, III | ...... | H04L 12/6418 |
| | | | | 370/352 |
| 2003/0225900 A1* | 12/2003 | Morishige | ............ | H04L 61/251 |
| | | | | 709/230 |
| 2004/0015729 A1* | 1/2004 | Elms | ....................... | G06F 21/83 |
| | | | | 726/28 |
| 2004/0199595 A1* | 10/2004 | Banister | ............... | H04L 51/212 |
| | | | | 709/207 |
| 2004/0233916 A1* | 11/2004 | Takeuchi | ........... | H04L 61/4511 |
| | | | | 370/395.54 |
| 2004/0260778 A1* | 12/2004 | Banister | ............... | H04L 51/212 |
| | | | | 709/224 |
| 2005/0038898 A1* | 2/2005 | Mittig | ................ | H04L 63/0421 |
| | | | | 709/230 |
| 2007/0058658 A1 | 3/2007 | Ruckart | | |
| 2007/0088749 A1* | 4/2007 | Lorch | .................. | H04L 63/029 |
| 2008/0235336 A1* | 9/2008 | Stern | .................. | H04L 63/0407 |
| | | | | 709/206 |
| 2009/0128861 A1 | 5/2009 | Toscano et al. | | |
| 2009/0150514 A1* | 6/2009 | Davis | .................... | H04L 61/103 |
| | | | | 709/217 |
| 2009/0177785 A1* | 7/2009 | Reid | .................. | H04L 65/1101 |
| | | | | 709/228 |
| 2010/0070591 A1* | 3/2010 | Steuer | ................. | G06Q 10/107 |
| | | | | 709/206 |
| 2010/0205313 A1* | 8/2010 | Boire-Lavigne | .... | H04L 65/1069 |
| | | | | 709/228 |
| 2010/0268804 A1* | 10/2010 | Aso | ..................... | H04L 61/5007 |
| | | | | 709/222 |
| 2010/0281535 A1* | 11/2010 | Perry, Jr. | ............... | H04L 51/212 |
| | | | | 715/752 |
| 2010/0325245 A1* | 12/2010 | Sibillo | ............... | G06F 16/9535 |
| | | | | 709/219 |
| 2011/0288962 A1* | 11/2011 | Rankin, Jr. | ............ | G06Q 30/02 |
| | | | | 726/28 |
| 2012/0204032 A1* | 8/2012 | Wilkins | ................... | H04L 9/321 |
| | | | | 713/170 |
| 2012/0311691 A1* | 12/2012 | Karlin | ................. | H04L 63/0281 |
| | | | | 726/12 |
| 2013/0067012 A1* | 3/2013 | Matzkel | .............. | H04L 63/0428 |
| | | | | 709/206 |
| 2013/0080575 A1* | 3/2013 | Prince | ..................... | H04L 61/25 |
| | | | | 709/217 |
| 2013/0091273 A1* | 4/2013 | Ly | ......................... | H04L 67/147 |
| | | | | 709/224 |
| 2014/0373106 A1 | 12/2014 | Morgenroth | | |
| 2015/0039677 A1* | 2/2015 | Kahol | ..................... | H04L 63/20 |
| | | | | 709/203 |
| 2018/0062995 A1* | 3/2018 | Naar | ..................... | H04L 63/166 |
| 2018/0375877 A1* | 12/2018 | Jakobsson | ............ | G06F 16/955 |
| 2019/0199745 A1* | 6/2019 | Jakobsson | ........... | H04L 63/1483 |
| 2019/0325064 A1 | 10/2019 | Mathiesen et al. | | |
| 2020/0134566 A1* | 4/2020 | Benkreira | .............. | H04L 51/42 |
| 2020/0159676 A1* | 5/2020 | Durham | .................. | G06F 21/12 |
| 2020/0382455 A1 | 12/2020 | Fasoli et al. | | |
| 2020/0409981 A1 | 12/2020 | Kadatoka et al. | | |
| 2021/0350328 A1* | 11/2021 | Benkreira | ............. | H04L 51/212 |
| 2021/0399983 A1* | 12/2021 | Blatt | ..................... | H04L 9/3236 |
| 2021/0406836 A1* | 12/2021 | Bar-On | ................. | G06F 40/205 |
| 2022/0400096 A1* | 12/2022 | Freed | ..................... | H04L 51/48 |
| 2023/0155978 A1* | 5/2023 | Thubert | .............. | H04L 63/0236 |
| | | | | 709/245 |

* cited by examiner

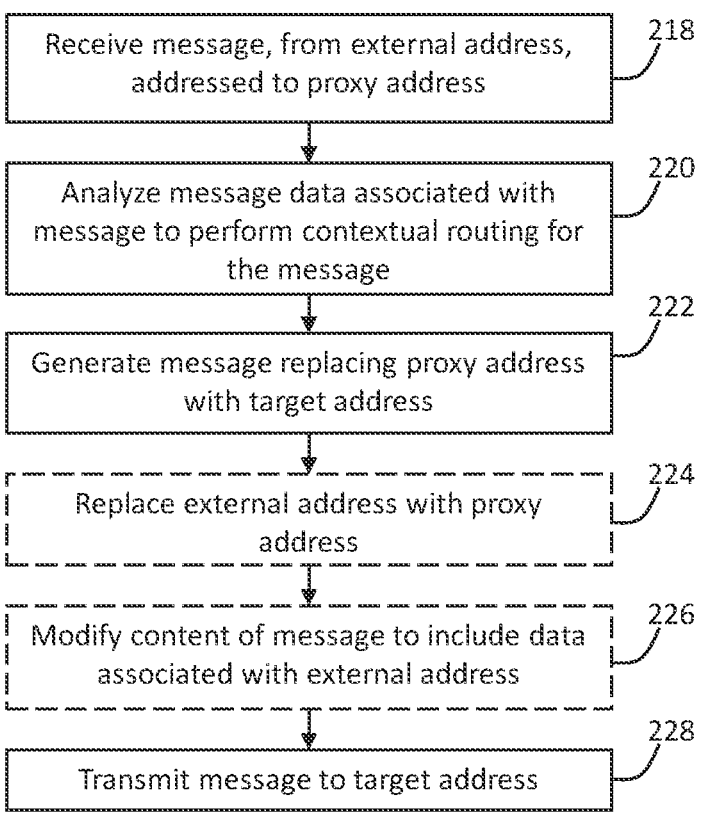

Receive message, from external address, addressed to proxy address — 218

Analyze message data associated with message to perform contextual routing for the message — 220

Generate message replacing proxy address with target address — 222

Replace external address with proxy address — 224

Modify content of message to include data associated with external address — 226

Transmit message to target address — 228

Fig. 2B

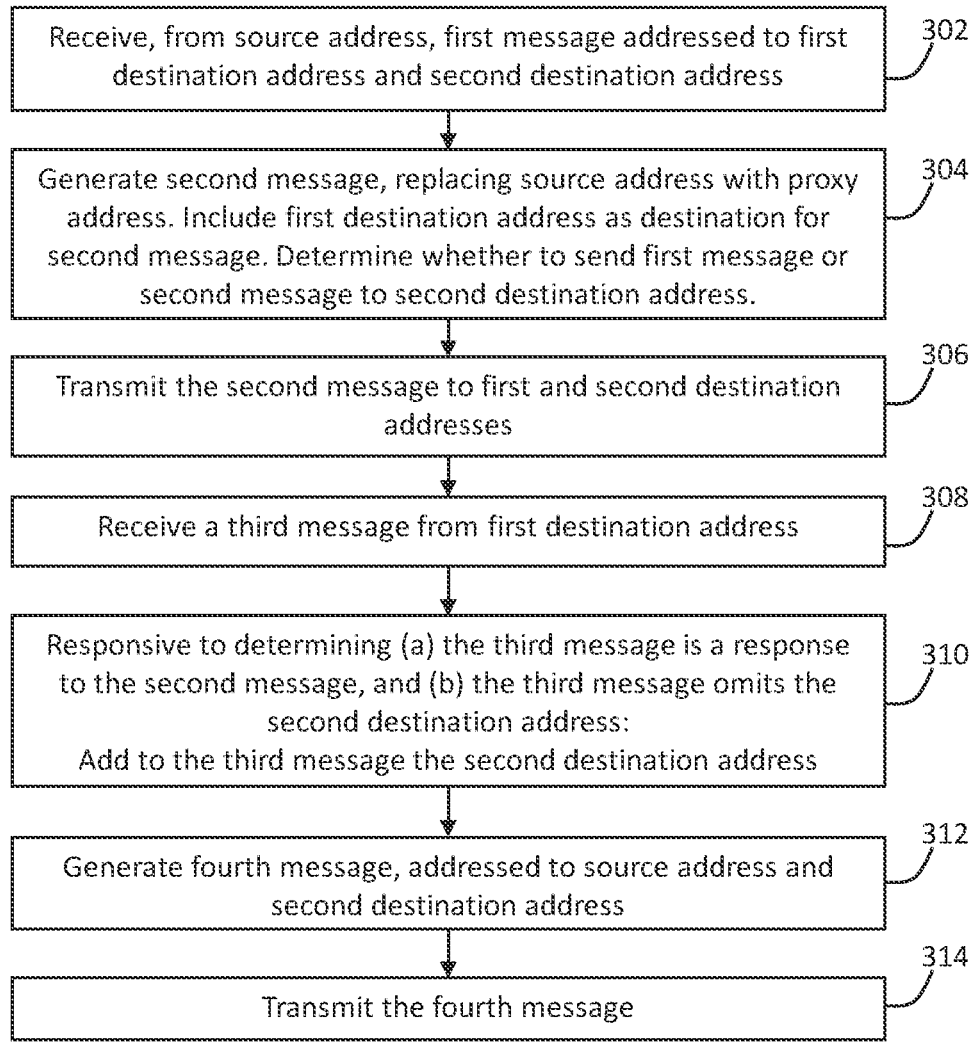

Receive, from source address, first message addressed to first destination address and second destination address          302

Generate second message, replacing source address with proxy address. Include first destination address as destination for second message. Determine whether to send first message or second message to second destination address.          304

Transmit the second message to first and second destination addresses          306

Receive a third message from first destination address          308

Responsive to determining (a) the third message is a response to the second message, and (b) the third message omits the second destination address:
Add to the third message the second destination address          310

Generate fourth message, addressed to source address and second destination address          312

Transmit the fourth message          314

Fig. 3

MANAGING DIGITAL MESSAGE TRANSMISSION VIA A PROXY DIGITAL MAILBOX

INCORPORATION BY REFERENCE; DISCLAIMER

The following application is hereby incorporated by reference: application No. 63/416,351 filed on Oct. 14, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to managing the transmission of digital messages via a proxy mailbox. In particular, the present disclosure relates to analyzing message content, including metadata and content within a message, to identify recipients for digital messages directed to a proxy mailbox.

BACKGROUND

Enterprises use generic email boxes to send messages to customers and to receive messages from customers. Typically, one or more users having permission may view messages in the generic email box. However, an email box receives a large volume of emails, it may be difficult for users to determine which emails apply to them. Users may miss opportunities or anger customers by failing to respond to emails in a timely manner. In addition, when users receive large volumes of emails, the user may find it difficult to remember the context associated with a particular email. For example, a recruiter may be dealing with ten different candidates, four active clients, and twenty or more opportunities associated with other recruiters or an entire recruiting firm. When reading candidate emails, the recruiter may find it difficult to remember a particular candidate's qualifications or a particular position's requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 2A and 2B illustrate an example set of operations for managing transmission of digital messages via a proxy mailbox in accordance with one or more embodiments;

FIG. 3 illustrates an example set of operations for identifying multiple digital message recipients for digital messages sent to a proxy mailbox in accordance with one or more embodiments;

DETAILED DESCRIPTION

Figure 1:
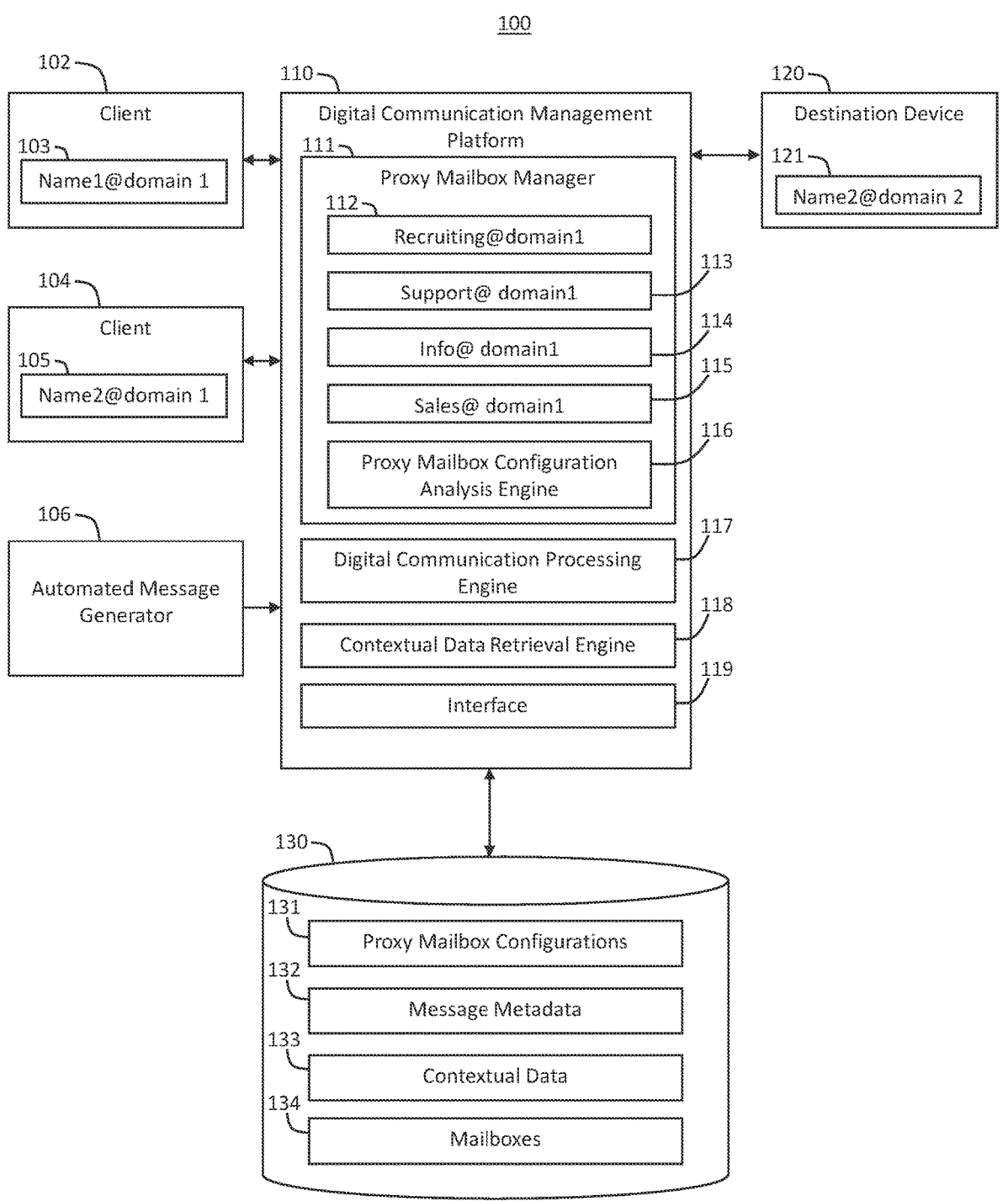
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. ANALYZING DIGITAL MESSAGE CONTENT TO MANAGE DIGITAL MESSAGE TRANSMISSION VIA A PROXY MAILBOX
4. ANALYZING DIGITAL MESSAGES TO A PROXY MAILBOX TO IDENTIFY MULTIPLE RECIPIENTS
5. EXAMPLE EMBODIMENT
6. COMPUTER NETWORKS AND CLOUD NETWORKS
7. MISCELLANEOUS; EXTENSIONS
8. HARDWARE OVERVIEW

1. GENERAL OVERVIEW

One or more embodiments include a digital message management platform for contextual routing of messages using a proxy address. The digital message management platform manages 1 to n and n to n communication, incorporating a proxy address for uniform messaging, user privacy, and message management. In an example, outbound messages from various users associated with the digital message management platform are sent out with a same proxy address as a source address (replacing the user's address). When response messages are received, the digital message management platform identifies the appropriate recipient(s) from the set of users, associated with the digital message management platform, based on contextual data determined from the message, message metadata, and/or a source of the response message.

Identifying the appropriate recipient(s) from the set of users for contextual routing may include identifying the initial user that sent the outbound message, identifying users that were included in the initial outbound message, identifying users that may contribute to the conversation, and/or identifying users that the system determines should be copied on the conversation based on an inclusion criteria.

According to one or more embodiments, contextual data used for routing messages may include, for example, personal information about the author of the reply message and information regarding matters the author of the reply message is associated with. The system provides to the initial source address the contextual information together with the reply message.

In one or more embodiments, the digital message management platform augments inbound and/or outbound messages with supplemental information that may be helpful to a recipient of a message. In an example, the digital message management platform forwards a message from a candidate to a recruiter. Prior to forwarding the message, the digital message management platform queries a database for hiring manager notes related to the candidate. The system appends the notes to the message prior to forwarding the message to the recruiter. The recruiter is then able to process and/or respond to the candidate's message in view of the hiring manager notes.

According to one or more embodiments, the system determines when a reply message should be sent to addresses other than the initial source address. For example, the initial source message may be "to: Bob@domain2.xxy" and "cc:Lucy@domain1.xxy." The system transmits an initial message to the addresses Bob@domain2.xxy and Lucy@domain1.xxy. If the system receives a reply from Bob @domain2.xxy which omits as a destination address Lucy@domain1.xxy, the system determines whether to also transmit the reply message to Lucy@domain1.xxy. For example, the system may apply a rule specifying that if (a) Lucy@domain1.xxy was included as a destination address of an initial digital message from a source address, and if (b) Lucy@domain1.xxy is not included in a reply message to the initial digital message, then the system modifies the destination addresses associated with the reply message to include the destination address Lucy@domain1.xxy.

According to one or more embodiments, the digital message management platform provides the contextual notifications and/or display of messages from a shared mailbox. For example, users may send messages from the email address of the shared mailbox and may receive messages in the shared mailbox. When a message is received at the address associated with the shared mailbox, the digital message management platform identifies one or more recipients with access to the shared mailbox based on contextual data determined from the message, message metadata, and/or a source of the message. The system may perform a notification operation such as (a) sending a notification to a particular communications platform, such as email, instant message, or text, that a message in the shared mailbox is associated with the recipient, (b) tagging the message in the shared mailbox with names of recipients associated with the message, and/or (c) categorizing the messages in the shared mailbox according to users. For example, the shared mailbox may include separate headers for each user with access to the shared mailbox. The system may display under each header the messages that the system has determined to be relevant to the particular user. In addition, or in the alternative, users may access email messages via a particular application. The particular application may access the shared mailbox and display for the user only the messages from the shared mailbox that are associated with the particular user. The system may display the shared mailbox so as to hide messages determined to be associated with other users and to which a particular user does not have viewing authority.

One or more embodiments provide for selectively anonymizing messages by the digital message management platform. For example, a user may generate a message to an outside address. The message generation graphical user interface (GUI) may include radio buttons to (a) show/hide the source address, and (b) show/hide the source sender name. For example, a user may hide the source address but show their name. A recipient would see an email from a proxy email address, or shared email address, and the name of the sender. Alternatively, a user may hide both the source address and the sender name. A recipient would see an email from a proxy email address, or shared email address, with the name of the sender omitted. In addition, or in the alternative, the message generation GUI may include radio buttons to show a sender name and/or address for recipients within the same organization as the sender (such as recipients with the same email domain) and to hide the sender name and/or address for recipients external to the organization.

One or more embodiments described in this Specification and/or recited in the claims may not be included in this General Overview section.

2. SYSTEM ARCHITECTURE

FIG. 1 illustrates a system 100 in accordance with one or more embodiments. As illustrated in FIG. 1, system 100 includes a digital communication management platform 110 and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

One or more clients 102, 104 communicate with the digital communication management platform 110 to transmit and receive digital messages, such as electronic mail (email). The digital communication management platform 110 transmits digital messages to, and receives digital messages from, one or more destination devices 120. For example, a client 102 associated with a first digital message address 103 may interface with a user interface, such as interface 119, of the digital communication management platform 110 to send a digital message to the destination device 120. A user associated with the digital message address 121 may access the destination device 120 to send a digital message to a proxy address 112-115.

According to one or more embodiments, clients 102 and 104 are associated with one or more devices, such as personal computers, laptops, or mobile devices. A user associated with an address 103 or 105 may communicate with the digital communication management platform 110 via any device. For example, a user associated with the address 103 may open an application at a workstation to access a cloud-based digital communication management platform 110 managed in-house by an enterprise. In addition, or in the alternative, the user associated with the address 103 may access the digital communication management platform 110 by entering a uniform resource locator (URL) into a web browser from any one of a personal computer, a laptop, and a mobile phone. In addition, or in the alternative, the digital communication management platform 110 may be implemented, at least in part, as an application downloadable onto a client device. A user associated with an address 103 or 105 may interface with the application to send and receive messages. The application may communicate with cloud-based resources to perform functions for transmitting, receiving, storing, and analyzing digital messages.

According to one or more embodiments, the system includes an automated message generator 106. The automated message generator 106 may generate messages, associated with one or more clients 102, 104, without user input from a user associated with the clients 102, 104. For example, a recruiting application may match employment opportunities to candidates associated with client 102. The recruiting application may generate, without user input from the client 102, an email message to each candidate with a link to one or more employment opportunities. When the digital communication management platform 110 transmits the message to the user associated with the address 121, the proxy mailbox manager 111 may specify a recruiting mailbox address 112 as a source address. When a user associated with the address 121 replies to the message, the digital communication management platform 110 may identify client 102 as being associated with the reply message, even though the initial message was generated by the automated message generator 106, was sent from an anonymized address 112, and the candidate replied to the anonymized address 112.

The digital communication management platform 110 includes a proxy mailbox manager 111, a contextual data retrieval engine 118, a digital communication processing engine 117, and the interface 119. In one or more embodiments, interface 119 refers to hardware and/or software configured to facilitate communications between a user and the digital communication management platform 110. Interface 119 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 119 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 119 is specified in one or more other languages, such as Java, C, or C++.

According to one embodiment, the interface 119 includes graphical user interface elements that allow users to selectively anonymize messages. For example, a user may use the address 103 to generate a message to an outside address 121. The interface 119 may provide to the client 102 a GUI including radio buttons, selectable by the user, to (a) show/hide the source address, and (b) show/hide the source sender name. The GUI may also include radio buttons to allow the user to selectively show their name and address to other users within the same organization, such as users with addresses including "domain1." When the user selects interface elements to hide the source address, the proxy mailbox manager 111 replaces the source address "name1@domain1" with the corresponding proxy address, such as "recruiting@domain1." The proxy mailbox manager 111 includes in the message a name associated with the address "name1@domain1." For example, a recipient may see in the address line: "name1<recruiting@domain1>". When the user selects interface elements to hide both the user name and the source address, the proxy mailbox manager 111 replaces the source address "name1@domain1" with the corresponding proxy address, such as "recruiting@domain1." The proxy mailbox manager 111 also omits from the message the name associated with the address "name1@domain1." For example, a recipient may see in the address line: "Recruiting<recruiting@domain1>".

The proxy mailbox manager 111 stores messages associated with one or more proxy mailboxes 134. In the embodiment illustrated in FIG. 1, the proxy mailboxes 134 include a recruiting mailbox associated with an address 112, a support mailbox associated with an address 113, an information mailbox associated with an address 114, and a sales mailbox associated with an address 115. Each proxy mailbox may be associated with one or more clients, such as users or employees. For example, an organization may include ten recruiters. The recruiting mailbox associated with the address 112 may manage messages from and to the ten recruiters. Likewise, the organization may include fifty customer support representatives. The support mailbox associated with the address 113 may manage messages from, and to, the fifty customer support representatives. For example, the proxy mailbox manager 111 receives a message directed to a proxy address 112, identifies a particular address 103 or 105 associated with the message, and generates a message, including the message content, to transmit to the particular address 103 or 105 identified as being associated with the message.

The proxy mailbox manager 111 includes a proxy mailbox configuration analysis engine 116. The proxy mailbox configuration analysis engine 116 analyzes proxy mailbox configurations 131 to identify rules for storing and transmitting messages. For example, a proxy mailbox configuration 131 may specify clients 102 or 104 to which messages should be sent. The proxy mailbox configurations 131 may specify conditions under which the proxy mailbox manager 111 should generate messages. For example, the proxy mailbox configuration analysis engine 116 may determine that if a message is personal in nature, based on semantic content, the proxy mailbox manager 111 should transmit the message to a recipient without generating a message from a proxy mailbox address. In contrast, the proxy mailbox configuration analysis engine 116 may determine that if a message is business-related, based on semantic content, the proxy mailbox manager 111 should generate a message, with the proxy mailbox address as the source address, including the message content. The proxy mailbox configurations 131 may specify that any messages sent from an address 103 should be carbon copies (cc'd) to address 105. The proxy mailbox configurations 131 may specify that any messages sent to the address 103 should be cc'd to the address 105. The proxy mailbox configurations 131 may specify that the proxy mailbox manager should generate a message to address 103, and cc address 105, when (a) a received message is a reply to a message originating from address 103, and (b) the message originating from address 103 cc'd address 105.

A digital communication processing engine 117 analyzes received digital communications to identify actions to be taken associated with the communications. For example, the digital communication processing engine 117 analyzes digital communications received from clients 102 and 104, and automated message generator 106 to identify a proxy mailbox from which to transmit the message. The digital communication processing engine 117 analyzes digital communications received from external addresses, such as address 121, directed to a proxy address 112, 113, 114, or 115, to identify an address 103 or 105 to which to send the message.

The digital communication processing engine 117 analyzes digital communications by analyzing content within the communications and/or metadata transmitted with, or associated with, the communications. For example, the message content may include a matter identification number within the text of a message, a name within the text of the message. Metadata may include a timestamp associated with the message, a source address (such as email address) from which the message was sent or an IP address or MAC address associated with a device from which the message was sent. Metadata may include a data file that is not visible within the message which includes data associated with the message. For example, the metadata may identify a sender of the message, an address of the sender, an addressee of the message, a priority of the message, and time data associated with the message.

A contextual data retrieval engine 118 identifies contextual data 133 associated with a digital message based on the message content and/or metadata associated with the message. For example, the contextual data retrieval engine 118 may retrieve employment opportunities, resumes, and related documentation associated with an employment candidate based on identifying the employment candidate as the sender of a digital message. The proxy mailbox manager 111 may send, together with the digital message, the contextual information, to a recruiter associated with the address 103. According to one or more embodiments, the system uses at least some contextual data to perform contextual routing of messages. In other words, the system identifies one or more target addresses for routing a message based on identified contextual data.

For example, the contextual data retrieval engine 118 may query a database for hiring manager notes related to the candidate. The proxy mailbox manager 111 appends the notes to the message prior to sending the message to the recruiter. The recruiter is then able to process and/or respond to the candidate's message in view of the hiring manager notes.

In one or more embodiments, the digital communication management platform 110 refers to hardware and/or software configured to perform operations described herein for receiving digital communications, analyzing content of the digital communications, identifying contextual data associated with the digital communications, and generating digital communications. Examples of operations for managing transmission of digital messages via a proxy mailbox based on content associated with received messages are described below with reference to FIGS. 2A and 2B and FIG. 3.

In an embodiment, the digital communication management platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Additional embodiments and/or examples relating to computer networks are described below in Section 6, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the digital communication management platform 110. Alternatively, or additionally, a data repository 130 may be implemented or executed on a computing system separate from the digital communication management platform 110. A data repository 130 may be communicatively coupled to the digital communication management platform 110 via a direct connection or via a network.

Information describing proxy mailbox configurations 131, message metadata 132, and contextual data 133 may be implemented across any of components within the system 100. However, this information is illustrated within the data repository 130 for purposes of clarity and explanation.

In one or more embodiments, a tenant (such as client 102 and/or client 104) is a user associated with a corporation, organization, enterprise or other entity that accesses a shared computing resource, such as the digital communication management platform 110.

3. ANALYZING DIGITAL MESSAGE CONTENT TO MANAGE DIGITAL MESSAGE TRANSMISSION VIA A PROXY MAILBOX

Figure 2A:
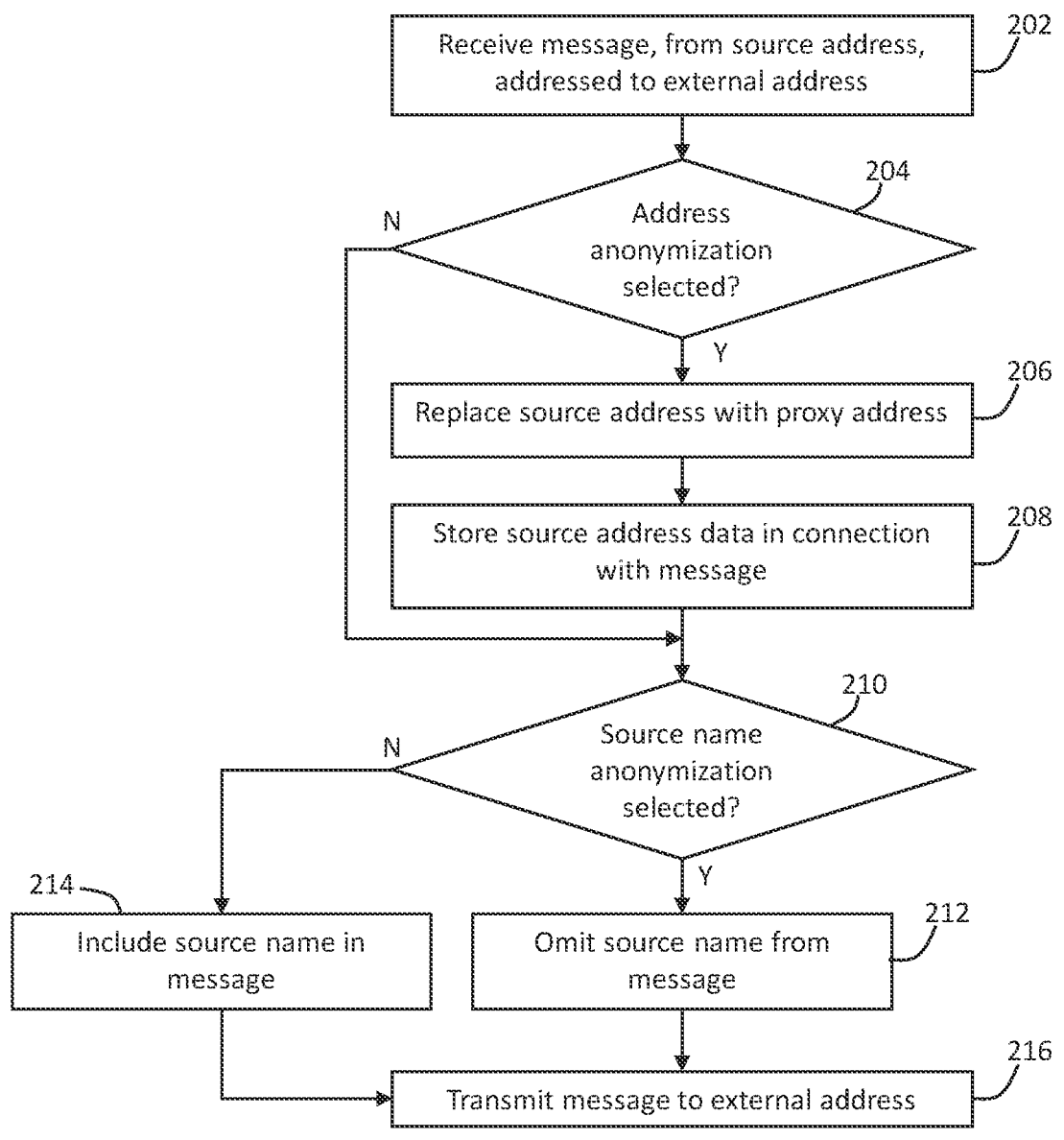

FIGS. 2A and 2B illustrate an example set of operations for managing digital message transmission to and from a proxy mailbox in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A system receives a message, from a source address, directed to an external address (Operation 202). A source address is an address associated with a proxy mailbox. For example, a company may maintain a proxy mailbox. Employees of the company may have access to the proxy mailbox for sending messages to addresses external to the company. The source address may be associated with an employee. In one or more embodiments, one proxy mailbox is associated with multiple users. For example, multiple employees may send messages from the same proxy mailbox. In an example embodiment in which the proxy mailbox is managed in a cloud environment, users may log in to a software platform associated with one or more servers in the cloud environment from a desktop computer or other computer. The platform may provide the user with a graphical user interface (GUI) for generating and/or receiving messages.

According to one or more embodiments, the received message is from a same domain as the proxy mailbox. For example, a user associated with an email address ABC@domain1.xxy may have access to a proxy mailbox proxy@domain1.xxy. Users not associated with email addresses matching a proxy mailbox domain may not have access to the proxy mailbox.

According to one embodiment, the message is an automatically-generated message which is generated without user input. For example, a system may identify three candidates meeting qualifications for a job positing. The system may generate an automated message requesting information, such as a resume, cover letter, writing samples, or transcripts.

The system determines whether a user has selected address anonymization for the message (Operation 204). For example, when the source of the message is a user, the system may provide the user with a GUI including selectable radio buttons to show/hide the source address. The selectable radio buttons may include options to show/hide the source address to all destination addresses or to selectively show/hide the source address. For example, a user may select a button to show the source address to other addresses with the same domain and to hide the source address from any addresses external to the domain. The selections to show/hide the source address may be selected by a user when generating a message or stored in predefined settings for the system to apply to any messages generated within a particular electronic messaging application.

According to one or more embodiments, the system determines whether to replace the source address with a proxy address by determining that the source address is associated with a permissions level granting a user associated with the source address access to the proxy mailbox. If the source address is not associated with a corresponding permission level, the system may refrain from replacing the source address with the proxy address. According to another example, the system may identify a source application from which a message is received. The system may determine whether to replace the source address with a proxy address based on the source application. For example, if a user generates and transmits a message from one type of application, such as an email application in a web browser, or an email service associated with an office application suite of applications, the system may refrain from replacing the source address with the proxy address. On the other hand, if the user generates and transmits a message using an application or browser plugin associated with a proxy email platform, the system may replace the source address with a proxy address. According to yet another example embodiment, the system may analyze account configuration settings to determine whether to replace the source address with a proxy address. For example, account configuration settings may specify that the system should replace the source address with a proxy address when an email is directed to an address in one set of address, and the system should not replace the source address with a proxy address when an email is directed to any other address. The account configuration settings may specify that the system should replace the source address with a proxy address when a user selects a particular icon on a GUI, and the system should not replace the source address with a proxy address when the user does not select the icon.

Based on detecting a selection to anonymize the source address, the system replaces the source address of the digital message with a proxy address (Operation 206). For example, if the message is received from an address ABC@domain1.xxy, the system replaces the address with the proxy address proxy@domain1.xxy. Replacing the address may include generating a new message including the proxy address. The new message includes the message content contained in the received digital message.

The system stores source address data in connection with the message (Operation 208). For example, upon replacing the source address with the proxy address, the system may store the source address as metadata in a digital file attached to the message. The metadata is not displayed in an address line of the message or in the content of the message.

According to one embodiment, a system includes an automated digital message generator. For example, as system may automatically generate messages to: notify job applicants of a next stage of an interview process, notify business or sales prospects of events or sales opportunities, and notify customers of events. The automated digital message generator may not have a specified address. Upon receiving a digital message from the automated digital message generator, the system assigns a proxy address to the digital message. The system may further identify a source address that should be associated with the digital message.

For example, the automated digital message generator may generate a reminder message for a client associated with a particular account. The system may identify a source address associated with the account and store the source address as metadata in the generated digital message which includes the proxy address as the source address in the digital message.

The system determines whether source name anonymization is selected (Operation 210). For example, a recruiter may send an initial message to prospects from a proxy email address. However, the recruiter may choose to keep their name in the email header to add a personal element to the message. Alternatively, a user may choose to omit their name from messages. For example, a customer support team may be assisting a particular customer. A member of the team may send a message without identifying themselves as the sender.

Based on determining that a user has selected source name anonymization, the system omits the user's name from the message (Operation 212). For example, the system may include only an email address in a "from" portion of a message. According to one embodiment, the system may also remove the user name from a signature portion. For example, the system may detect whether the user has set up an email account to automatically include the user's name in a "signature" with every message. Based on detecting a user selection to anonymize the source name, the system may omit the user's name from the address portion of the message and remove the user name from the signature portion of the message.

Based on determining that a user has refrained from selecting source name anonymization, the system includes the user's name in the message (Operation 214). For example, the system may include the user's name in association with a proxy email address, such as: "John Johnson@proxyaddress1.xyz".

The system transmits the message to the external address, with the proxy address displayed as the source address of the message (Operation 216). In an example in which the digital message is an email address, the system lists the proxy address in the "from:" field and the external address in the "to:" field. The system refrains from displaying the originating source address.

The system receives a message, addressed to the proxy address, from the external address (Operation 218).

The system analyzes the received message to perform contextual routing for the message (Operation 220). Specifically, the system identifies contextual data that informs the system to which target address or addresses the system should route the message. The target address is an address different from the proxy address. In particular, when multiple users associated with multiple different digital message addresses have access to a proxy mailbox, the system analyzes the received message to identify a particular target address from among the multiple different digital message addresses to which the system will send the message. According to one embodiment, the system identifies the message as a reply to a message sent from the proxy address. The system may analyze stored metadata associated with the replied-to message to identify the target address. According to another example embodiment, the system analyzes metadata transmitted with the message to identify the target address. According to yet another embodiment, the system analyzes message content, such as a matter ID number included in the message content, to identify a target address. For example, a subject of a message may include the text: "Re: Matter: ZZXX11 Employment Opportunity." The system may identify matter ZZXX11 as being associated with two target addresses: ABC@domain1.xxy and DEF@domain1.xxy.

The system generates a message, directed to the target address, including the message content of the received message (Operation 222). For example, if the message, directed to the address "recruiting@domain1.xxy" includes the text: "I'm interested in this opportunity!," the system generates a message, directed to the target address ABC@domain1.xxy, including the text: "I'm interested in this opportunity!"

According to one or more embodiments, the system identifies contextual data associated with the message. For example, the system may identify, based on an external address ggpyz@domain3.xxy, a user associated with the external address. The system may identify documents previously submitted by the user, such as a resume, employment cover letter, or application. The system may identify employee-generated data, such as customer support tickets, notes regarding qualifications or interviews, or any other employee-generated data stored in connection with the user. The system may include the contextual data together with the generated message. For example, the system may include documents as attachments attached to the message. In addition, or in the alternative, the system may include a hyperlink in the content of the message that directs an employee to the contextual data, such as a previously-submitted application.

According to one embodiment, the system replaces, in the message to the target address, the external address with the proxy address (Operation 224). For example, an employee accessing an email box associated with the address ABC@domain1.xxy would see messages from the proxy address recruiting@domain1.xxy.

The system may modify the content of the message to include identifying information associated with the external address (Operation 226). The identifying information may include, for example, the external email address, a name of a user associated with the external email address, and a matter associated with the user. According to one example, embodiment, if the employee replies to the message, such as by selecting a "Reply" messaging function, the system may identify the external address associated with the message, even when the address in the "from:" field of the digital message is the proxy address. In other words, both an employee and an external user may reply to messages from a proxy address. The system, in each case, generates a substitute message directed to a particular target address (e.g., the employee address or the address associated with the external user).

According to one or more embodiments, the system includes files or links to data associated with the external email address. For example, when a job applicant responds to a message, the system may modify the response to include a link to the applicant's profile associated with the external address. In addition, or in the alternative, the system may attach a data file, such as a resume in the case of a job applicant, to the message prior to sending the message to the target user.

In FIG. 2B, the dashed lines associated with Operation 224 and 226 indicate the particular operations may alternatively not be performed by the system. In particular, according to an alternative embodiment, the system may generate the message to the target address while leaving in a "from:" field of the message the external address.

Upon at least generating the message directed to the target address, the system transmits the message to the target address (Operation 228).

As described in FIGS. 2A and 2B, a system manages digital messages transmitted to and from a proxy mailbox. The system replaces source addresses of outgoing messages with a proxy address. External users receiving the messages see messages from a proxy address instead of an address of a particular user. The system analyzes messages received at the proxy mailbox to generate messages to target addresses associated with particular users. The system further identifies and provides contextual data associated with external users to internal users associated with the target addresses, based on digital message data included in a received message.

4. ANALYZING DIGITAL MESSAGES TO A PROXY MAILBOX TO IDENTIFY MULTIPLE RECIPIENTS

FIG. 3 illustrates an example set of operations for identifying recipients for digital messages to a proxy mailbox in accordance with one or more embodiments. One or more operations illustrated in FIG. 3 may be modified, rearranged, or omitted all together. Accordingly, the particular sequence of operations illustrated in FIG. 2 should not be construed as limiting the scope of one or more embodiments.

A system receives a first message from a source address (Operation 302). The message is directed to a first destination address and a second destination address. For example, a user within a company ("internal user") may generate an email to an external user and carbon copy (cc) another employee of the company in the message.

The system generates a second message, from a proxy address to at least the first destination address, including the content of the original message (Operation 304). For example, as discussed above in connection with FIG. 2A, if the message is received from an address ABC @domain1.xxy, the system replaces the address with the proxy address proxy@domain1.xxy. According to one embodiment, the system replaces the source address with the proxy address in messages to both the first destination address and the second destination address. According to one or more alternative embodiments, the system may determine, for each destination address associated with a digital message, whether to replace the source address with a proxy address. For example, the system may analyze the domain of multiple destination addresses associated with a digital message. If the one domain is the same as the source address, the system may refrain from replacing the source address with the proxy address. In other words, if the destination address is within the same organization (and so has the same domain) as the sending address, the system does not replace the sending address with the proxy address. If the domain of the destination address is different from the domain of the source address, the system replaces the source address with the proxy address. Accordingly, any address outside a particular organization may see proxy addresses instead of personal addresses of employees. In the example embodiment illustrated in FIG. 3, the system determines that the second message should be addressed to both the first and second destination addresses.

The system transmits the second message to the first and second destination addresses (Operation 306).

The system receives a third message, directed to the proxy address, from the first destination address (Operation 308).

As discussed above in connection with FIG. 2A, the message may be a reply to a message sent from the proxy address.

The system analyzes the third message to perform contextual routing of the third message (Operation 310). As discussed above in connection with FIG. 2B, the system may analyze content within the message text, content within a subject field of the message, and/or metadata associated with the message to determine the target address to which to route the third message.

In the example embodiment illustrated in FIG. 3, the system determines that the third message is a reply to the second message. The system further determines that the second message corresponds to the first message, which was addressed to the first destination address and the second destination address.

Accordingly, the system generates a fourth message, directed to the source address (Operation 312). The system includes in the fourth message the content of the third message.

The system further determines that the third message does not include the second destination address as a destination address for the third message. Based on determining (a) the third message is associated with the first message, and (b) the third message does not include the second address as a destination address, the system determines whether to include the second destination address as a destination for the fourth message.

The system may apply a particular rule to determine whether to include the second destination address as a destination for the fourth message. According to one embodiment, a rule may specify that if the second message includes both (a) the first destination address and (b) the second destination address in a "to:" or "cc:" field, then any response from the first destination address will be transmitted to the second destination address, even if the response does not include the second destination address among the message's destination addresses. According to another embodiment, a rule may specify that any messages directed from a proxy address to the source address must also be transmitted to the second destination address. Alternatively, a rule may specify that messages directed to the proxy address that do not include the second destination address are not sent to the second destination address, even if the messages are replies to initial messages that included the second destination address as a destination for the messages. According to one example embodiment, rules for determining whether to send "reply" type messages to additional addresses, in addition to an initiating address, may be configured by a user and stored by the system.

According to one or more embodiments, in addition to identifying users that were included in the initial outbound message, the system may identify users that may contribute to the conversation, and/or identifying users that the system determines should be copied on the conversation based on an inclusion criteria. For example, a rule may implement contextual routing of a message to a particular address by specifying that any message containing a matter ID "ZZYY11" should be sent, together with any other identified, to the particular address.

In the example embodiment illustrated in FIG. 3, the system applies a rule specifying that if the second message includes both (a) the first destination address and (b) the second destination address in a "to:" or "cc:" field, then any response from the first destination address will be transmitted to the second destination address, even if the response does not include the second destination address among the message's destination addresses. Accordingly, when generating the fourth message in Operation 312, the system includes the second destination address as a destination for the fourth message.

The system transmits the fourth message to the source address and the second destination address (Operation 314).

5. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4:
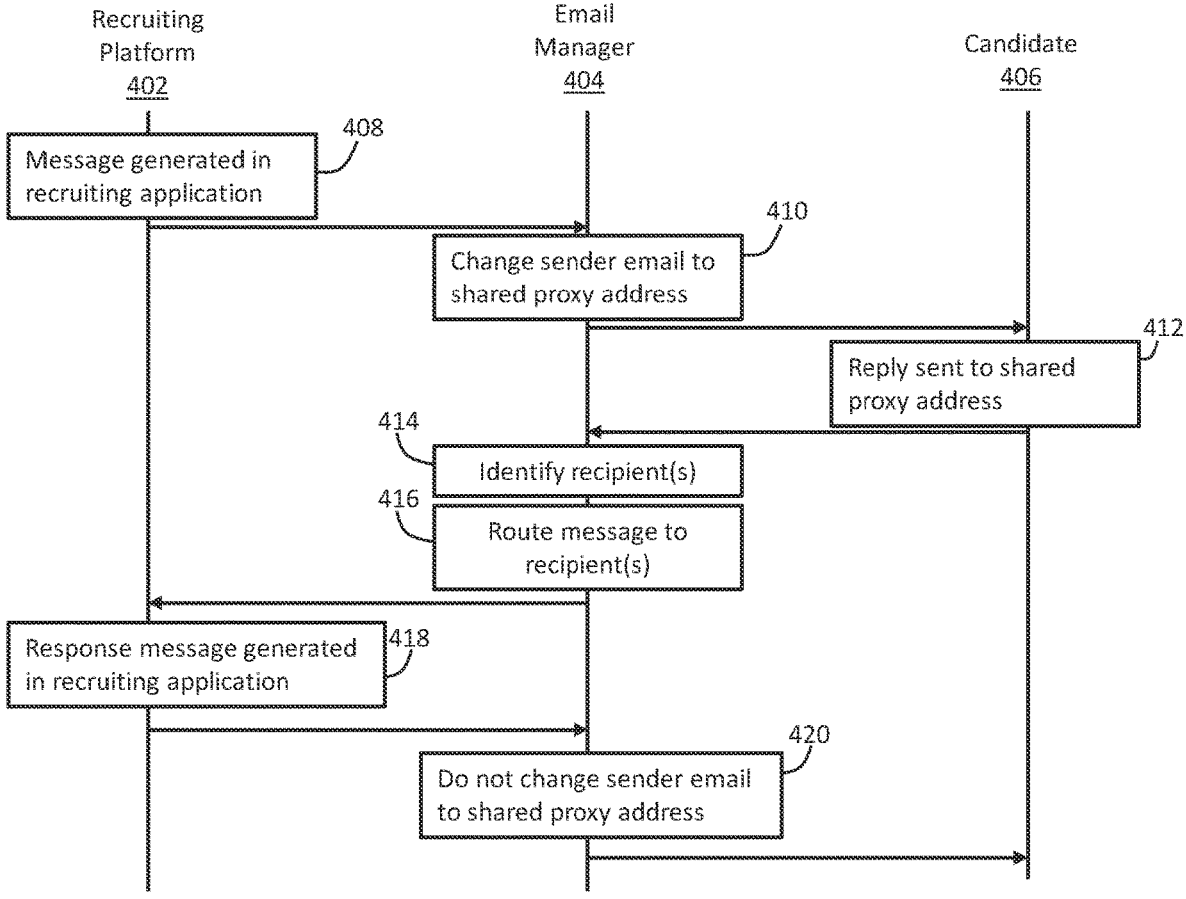
FIG. 4 illustrates an example embodiment.

FIG. 4 illustrates a recruiting platform 402 utilizing an email manager 404 to transmit and receive emails. A recruiting application transmits an email to a candidate (Operation 408). The recruiting application includes an email generator that generates automated emails associated with employment opportunities that match the candidate's qualifications. The automated email generator generates the email. The email manager 404 assigns the proxy email address "careers@vision.xyz" as a source email address for the email (Operation 410). According to the example embodiment illustrated in FIG. 4, the email generator accesses pre-stored messages that are sent to candidates without requiring a recruiter to enter message content. For example, a recruiter may be shown an interface including a set of applicants that appear to meet preliminary qualifications for a particular job posting. The recruiter may select three applicants. The email generator may automatically, without further recruiter input, generate messages to send to the three applicants requesting additional information from the applicants to move to the next stage of the interview process. As another example, the email generator may match requirements of newly-posted jobs to applicant profiles stored in the recruiting platform. Based on detecting a potential match, the email generator may generate emails to potential candidates informing them of the job postings and providing a link at which the potential candidate may apply to the job posting.

In addition to an automated email generator, a recruiter may use the recruiting platform 402 to generate an email. The email manager 404 replaces a source email address from the sender's email address to the proxy email address (e.g., from "John Johnson@vision.xyz" to "careers vision.xyz").

The candidate 406 replies to the email from the recruiting application (Operation 412). Since the candidate's email is a reply-type email, the email is directed to the proxy mailbox "careers@vision.xyz."

The email manager 404 receives the reply message and uses contextual information associated with the reply message to identify a recruiter associated with the reply message (Operation 414). For example, a recruiting company may have three recruiters. Each recruiter may be associated with particular employment opportunities and/or particular candidates. The system analyzes message data, such as content within the email or metadata associated with the email, to identify a particular recruiter. The content may include: a job posting number associated with a particular recruiter, an applicant name associated with a particular recruiter, or a message identification (ID) number associated with a source message to which the candidate 406 is replying. The system transmits the reply message to the particular recruiter's email inbox (Operation 416).

The system also identifies contextual data associated with the candidate and/or the employment opportunity the candidate has expressed interest in. For example, the system may include in the email to the recruiter a resume and a list of previous and/or pending employment opportunities the candidate has applied to.

The recruiter responds to the candidate's reply email (Operation 418). For example, the recruiter may request an updated resume, cover letter, or work product to complete an application for the employment opportunity. The system receives the email generated by the recruiter. Based on predefined settings, the system transmits the recruiter's email message to the candidate without changing the sender email to the proxy address, and without removing the recruiter's name from the email (Operation 420). For example, the system may detect a recruiter's selection of a radio icon in a graphical user interface for generating email message indicating that the recruiter would like their email address to remain visible to the candidate 406. In addition, or in the alternative, the system may apply pre-defined rules specifying when to replace, and when not to replace, a recruiter's email address with a proxy email address. The rules may specify that when a recruiter is replying to a candidate's email, the system should not replace the recruiter's email address with the proxy email address.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein for managing the transmission of digital messages via a proxy mailbox are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
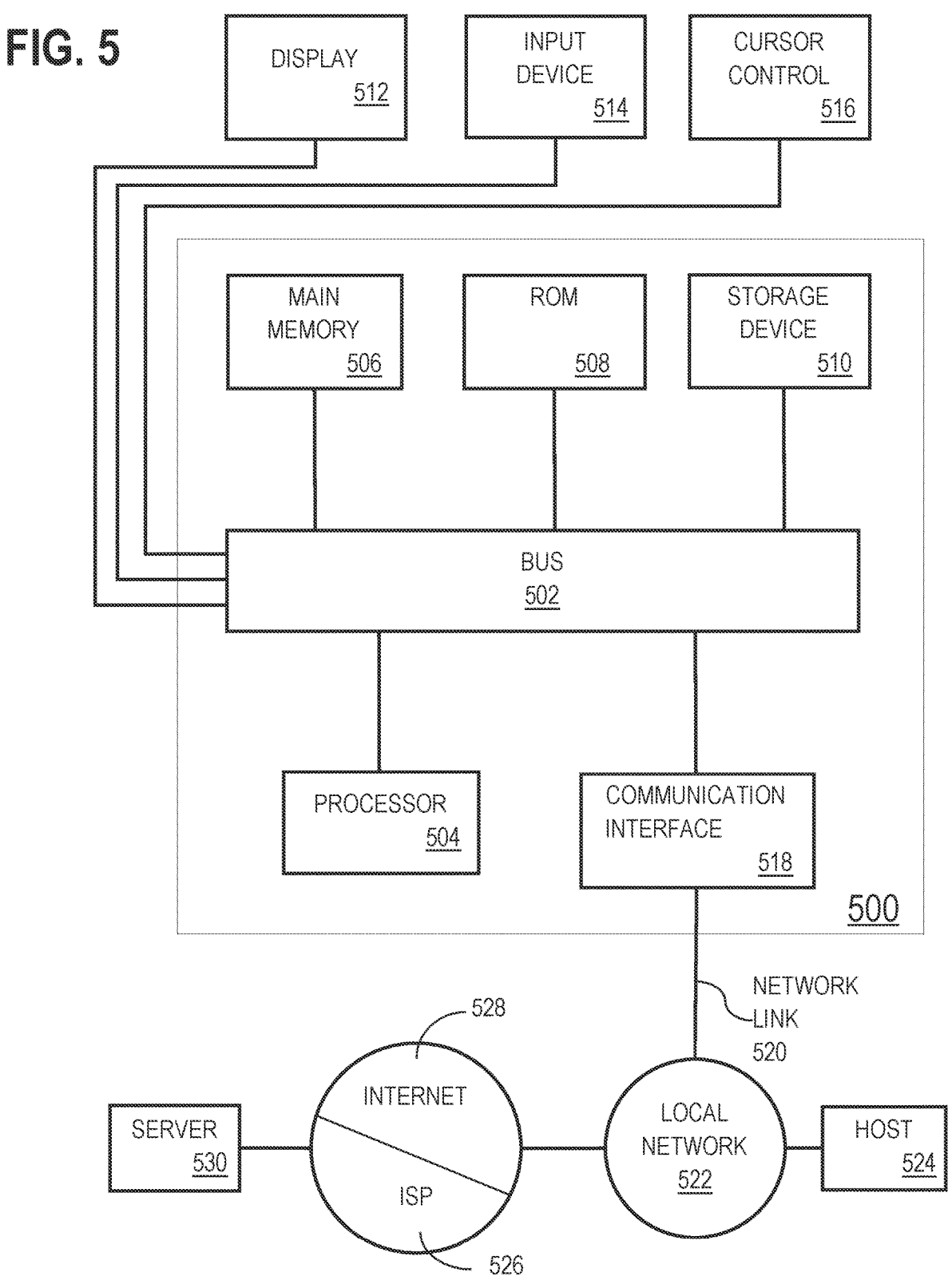
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

receiving, by a digital message management application from a first email address, a first message directed to a second email address, the first message comprising message content;

generating, by the digital message management application, a second message comprising the message content of the first message, the second message identifying (a) a proxy email address as a source address of the second message, the proxy email address associated with a plurality of source email addresses comprising at least the first email address, and (b) the second email address as a first destination address of the second message;

transmitting, by the digital message management application from the proxy email address, the second message to the second email address, wherein the digital message management application is configured to (a) receive a first set of messages from the plurality of source email addresses directed to one or more destination addresses, (b) generate a second set of messages at least by replacing the plurality of source email addresses in the first set of messages with a same proxy email address, and (c) transmit the second set of messages to the one or more destination addresses with the same proxy email address identified as the source address of the second set of messages;

receiving, by the digital message management application from the second email address, a third message corresponding to a response to the second message, the third message directed to the proxy email address associated with the plurality of source email addresses comprising at least the first email address;

identifying, from the plurality of source email addresses associated with the proxy email address, the first email address at least by:

responsive to receiving the third message directed to the proxy email address, mapping the proxy email address to the plurality of source email addresses;

executing a correlation identification operation in association with the plurality of source email addresses mapped to the proxy email address, the correlation identification operation comprising determining whether the third message has a first correlation with any of the plurality of source email addresses associated with the proxy email address;

based on the correlation identification operation, identifying the first correlation between the third message and the first email address of the plurality of source email addresses associated with the proxy email address;

generating, by the digital message management application, a fourth message comprising the message content of the third message, the fourth message identifying the first email address as a second destination address of the fourth message; and transmitting, by the digital message management application, the fourth message to the first email address.

2. The non-transitory computer readable medium of claim 1, wherein the operations further comprise:

identifying contextual information corresponding to either (a) a user corresponding to the second email address, and/or (b) the third message, wherein the contextual information is omitted from the first message, the second message, and the third message; and transmitting the contextual information with the fourth message to the first email address.

3. The non-transitory computer readable medium of claim 2, wherein the contextual information includes at least one of:

a user profile;

employment data associated with the user; and previous communications between the first email address and the second email address.

4. The non-transitory computer readable medium of claim 1, wherein generating, by the digital message management application, the second message, comprises:

storing metadata in the second message, the metadata identifying the first email address as an original source of the first message.

5. The non-transitory computer readable medium of claim 1, wherein the first, second, third, and fourth messages are electronic mail (email) messages.

6. The non-transitory computer readable medium of claim 1, wherein analyzing the third message to identify the first correlation between the third message and the first email address includes analyzing metadata in the third message, the metadata including information identifying the first email address.

7. The non-transitory computer readable medium of claim 6, wherein the operations further comprise:

attaching a metadata file to the second message that identifies the first message and the first email address, wherein the metadata file is attached to the third message based on the third message being in response to the second message, and wherein analyzing metadata in the third message comprises accessing the first email address in the metadata file.

8. The non-transitory computer readable medium of claim 1, wherein generating the fourth message comprises:

assigning the proxy email address as the source address of the fourth message; and modifying content of the third message to include identifying information associated with the second email address.

9. The non-transitory computer readable medium of claim 1, wherein the operations further comprise:

receiving, by the digital message management application from the second email address, a fifth message directed to the proxy email address;

analyzing the fifth message to identify a second correlation between the fifth message and the first email address; and responsive to determining that the fifth message does not meet a forwarding criteria for forwarding the fifth message to the first email address:

refraining from forwarding the fifth message to the first email address.

10. The non-transitory computer readable medium of claim 1, wherein the operations further comprise:

receiving, by the digital message management application from a third email address, a fifth message directed to the second email address, the fifth message comprising fifth message content;

generating, by the digital message management application, a sixth message comprising the fifth message content of the fifth message, the sixth message identifying (a) the proxy email address as the source address of the sixth message, and (b) the second email address as the first destination address of the sixth message; and transmitting, by the digital message management application from the proxy email address, the sixth message to the second email address.

11. The non-transitory computer readable medium of claim 10, wherein the operations further comprise:

receiving, by the digital message management application from the second email address, a seventh message corresponding to a response to the sixth message, the seventh message directed to the proxy email address, and the seventh message comprising seventh message content;

analyzing, by the digital message management application, the seventh message to identify a second correlation between the seventh message and the third email address;

generating, by the digital message management application, an eighth message comprising the seventh message content of the seventh message, the eighth message identifying the third email address as a third destination address of the eighth message; and transmitting, by the digital message management application, the eighth message to the third email address.

12. The non-transitory computer readable medium of claim 1, wherein the correlation identification operation comprises:

determining the third message is a reply to the second message;

determining the second message was generated based on receiving the first message; and responsive to determining (a) the third message is a reply to the second message and (b) the second message was generated based on receiving the first message:

determining the first message was sent from the first email address.

13. The non-transitory computer readable medium of claim 1, wherein the correlation identification operation comprises:

determining a first timestamp stored in metadata of the third message matches a second timestamp associated with the first message.

14. The non-transitory computer readable medium of claim 1, wherein the correlation identification operation comprises:

determining a first Internet Protocol (IP) address or Media Access Control (MAC) address stored in metadata of the third message matches a second IP address or MAC address associated with the first message.

15. The non-transitory computer readable medium of claim 1, wherein generating the fourth message further comprises:

identifying at least one additional communication between the first email address and the second email address; and including the at least one additional communication in the fourth message.

16. The non-transitory computer readable medium of claim 1, wherein the operations further comprise:

receiving, by the digital message management application from a third email address, a fifth message directed to a fourth email address;

generating, by the digital message management application, a sixth message comprising message content of the fifth message, the sixth message identifying (a) the proxy email address as the source address of the sixth message, and (b) the fourth email address as a third destination address of the sixth message; and transmitting, by the digital message management application from the proxy email address, the sixth message to the fourth email address.

17. The non-transitory computer readable medium of claim 16, wherein the operations further comprise:

receiving, by the digital message management application from the fourth email address, a seventh message corresponding to a response to the sixth message, the seventh message directed to the proxy email address;

identifying, from the plurality of source email addresses associated with the proxy email address, the third email address at least by:

responsive to receiving the seventh message directed to the proxy email address, mapping the proxy email address to the plurality of source email addresses;

executing the correlation identification operation in association with the plurality of source email addresses mapped to the proxy email address, the correlation identification operation comprising determining whether the seventh message has any correlation with any of the plurality of source email addresses associated with the proxy email address;

based on the correlation identification operation, identifying a second correlation between the seventh message and the third email address of the plurality of source email addresses associated with the proxy email address;

generating, by the digital message management application, an eighth message comprising the message content of the seventh message, the eighth message identifying the third email address as a fourth destination address of the eighth message; and transmitting, by the digital message management application, the eighth message to the third email address.

18. A method comprising:

receiving, by a digital message management application from a first email address, a first message directed to a second email address, the first message comprising message content;

generating, by the digital message management application, a second message comprising the message content of the first message, the second message identifying (a) a proxy email address as a source address of the second message, the proxy email address associated with a plurality of source email addresses comprising at least the first email address, and (b) the second email address as a first destination address of the second message;

transmitting, by the digital message management application from the proxy email address, the second message to the second email address, wherein the digital message management application is configured to (a) receive a first set of messages from the plurality of source email addresses directed to one or more destination addresses, (b) generate a second set of messages at least by replacing the plurality of source email addresses in the first set of messages with a same proxy email address, and (c) transmit the second set of messages to the one or more destination addresses with the same proxy email address identified as the source address of the second set of messages;

receiving, by the digital message management application from the second email address, a third message corresponding to a response to the second message, the third message directed to the proxy email address associated with the plurality of source email addresses comprising at least the first email address;

identifying, from the plurality of source email addresses associated with the proxy email address, the first email address at least by:

responsive to receiving the third message directed to the proxy email address, mapping the proxy email address to the plurality of source email addresses;

executing a correlation identification operation in association with the plurality of source email addresses mapped to the proxy email address, the correlation identification operation comprising determining whether the third message has a correlation with any of the plurality of source email addresses associated with the proxy email address;

based on the correlation identification operation, identifying a first correlation between the third message and the first email address of the plurality of source email addresses associated with the proxy email address;

generating, by the digital message management application, a fourth message comprising the message content of the third message, the fourth message identifying the first email address as a second destination address of the fourth message; and transmitting, by the digital message management application, the fourth message to the first email address.

19. The method of claim 18, further comprising:

identifying contextual information corresponding to either (a) a user corresponding to the second email address, and/or (b) the third message, wherein the contextual information is omitted from the first message, the second message, and the third message; and transmitting the contextual information with the fourth message to the first email address.

20. The method of claim 19, wherein the contextual information includes at least one of:

a user profile;

employment data associated with the user; and previous communications between the first email address and the second email address.

21. The method of claim 18, wherein generating, by the digital message management application, the second message, comprises:

replacing the second email address with the proxy email address as the first destination address of the second message; and storing metadata in the second message, the metadata identifying the first email address as a source of the first message.

22. The method of claim 18, wherein the first, second, third, and fourth messages are electronic mail (email) messages.

23. The method of claim 18, wherein analyzing the third message to identify the first correlation between the third message and the first email address includes analyzing metadata in the third message, the metadata including information identifying the first email address.

24. The method of claim 18, wherein generating the fourth message comprises:

assigning the proxy email address as the source address of the fourth message; and modifying content of the third message to include identifying information associated with the second email address.

25. The method of claim 18, further comprising:

receiving, by the digital message management application from the second email address, a fifth message directed to the proxy email address;

analyzing the fifth message to identify a second correlation between the fifth message and the first email address; and responsive to determining that the fifth message does not meet a forwarding criteria for forwarding the fifth message to the first email address:

refraining from forwarding the fifth message to the first email address.

26. The method of claim 18, further comprising:

receiving, by the digital message management application from a third email address, a fifth message directed to the second email address, the fifth message comprising fifth message content;

generating, by the digital message management application, a sixth message comprising the fifth message content of the fifth message, the sixth message identifying (a) the proxy email address as the source address of the sixth message, and (b) the second email address as the first destination address of the sixth message; and transmitting, by the digital message management application from the proxy email address, the sixth message to the second email address.

27. The method of claim 26, further comprising:

receiving, by the digital message management application from the second email address, a seventh message corresponding to a response to the sixth message, the seventh message directed to the proxy email address, and the seventh message comprising seventh message content;

analyzing, by the digital message management application, the seventh message to identify a second correlation between the seventh message and the third email address;

generating, by the digital message management application, an eighth message comprising the seventh message content of the seventh message, the eighth message identifying the third email address as a third destination address of the eighth message; and transmitting, by the digital message management application, the eighth message to the third email address.

28. A system comprising:

one or more processors; and memory storing instructions that, when executed by the one or more processors, cause the system to perform operations comprising:

receiving, by a digital message management application from a first email address, a first message directed to a second email address, the first message comprising message content;

generating, by the digital message management application, a second message comprising the message content of the first message, the second message identifying (a) a proxy email address as a source address of the second message, the proxy email address associated with a plurality of source email addresses comprising at least the first email address, and (b) the second email address as a first destination address of the second message;

transmitting, by the digital message management application from the proxy email address, the second message to the second email address, wherein the digital message management application is configured to (a) receive a first set of messages from the plurality of source email addresses directed to one or more destination addresses, (b) generate a second set of messages at least by replacing the plurality of source email addresses in the first set of messages with a same proxy email address, and (c) transmit the second set of messages to the one or more destination addresses with the same proxy email address identified as the source address of the second set of messages;

receiving, by the digital message management application from the second email address, a third message corresponding to a response to the second message, the third message directed to the proxy email address associated with the plurality of source email addresses comprising at least the first email address;

identifying, from the plurality of source email addresses associated with the proxy email address, the first email address at least by:

responsive to receiving the third message directed to the proxy email address, mapping the proxy email address to the plurality of source email addresses;

executing a correlation identification operation in association with the plurality of source email addresses mapped to the proxy email address, the correlation identification operation comprising determining whether the third message has a correlation with any of the plurality of source email addresses associated with the proxy email address;

based on the correlation identification operation, identifying a first correlation between the third message and the first email address of the plurality of source email addresses associated with the proxy email address;

generating, by the digital message management application, a fourth message comprising the message content of the third message, the fourth message identifying the first email address as a second destination address of the fourth message; and transmitting, by the digital message management application, the fourth message to the first email address.

29. The system of claim 28, wherein the operations further comprise:

identifying contextual information corresponding to either (a) a user corresponding to the second email address, and/or (b) the third message, wherein the contextual information is omitted from the first message, the second message, and the third message; and transmitting the contextual information with the fourth message to the first email address.

\* \* \* \* \*